(12) United States Patent
Zhao et al.

(10) Patent No.: US 12,441,921 B2
(45) Date of Patent: Oct. 14, 2025

(54) SILICATE-MODIFIED POLYMER GROUTING MATERIAL FOR LEAKAGE PLUGGING

(71) Applicants: SAFEKEY Engineering Technology (Zhengzhou), Ltd., Henan (CN); Huizhou Mingsheng Chemical Materials Co., LTD.

(72) Inventors: Peng Zhao, Henan (CN); Hongyuan Fang, Henan (CN); Lei Wang, Guangdong (CN); Mingrui Du, Guangdong (CN); Yanhui Pan, Henan (CN); Hui Liu, Henan (CN)

(73) Assignees: SAFEKEY Engineering Technology (Zhengzhou), Ltd., Henan (CN); Huizhou Mingsheng Chemical Materials Co., LTD., Guangdong (CN)

( * ) Notice: Subject to any disclaimer, the term of this patent is extended or adjusted under 35 U.S.C. 154(b) by 577 days.

(21) Appl. No.: 17/945,430

(22) Filed: Sep. 15, 2022

(65) Prior Publication Data
US 2023/0041315 A1  Feb. 9, 2023

(30) Foreign Application Priority Data
Jan. 28, 2022 (CN) .......................... 202210109293.1

(51) Int. Cl.
*C09K 3/12* (2006.01)
(52) U.S. Cl.
CPC ..................................... *C09K 3/12* (2013.01)

(58) Field of Classification Search
None
See application file for complete search history.

(56) References Cited

FOREIGN PATENT DOCUMENTS

| CN | 102050836 A | * | 5/2011 | |
|---|---|---|---|---|
| CN | 105111411 A | * | 12/2015 | |
| CN | 106565927 A | * | 4/2017 | ........... C08G 18/302 |

OTHER PUBLICATIONS

CN-102050836-A English Machine Translation (Year: 2025).*
CN-105111411-A English Machine Translation (Year: 2025).*
CN-106565927-A English Machine Translation (Year: 2025).*

* cited by examiner

*Primary Examiner* — Randy P Gulakowski
*Assistant Examiner* — Holley Grace Hester

(57) ABSTRACT

A silicate-modified polymer grouting material for leakage plugging is provided, which belongs to the technical field of silicate modification, includes 60% by weight of silicate-modified aqueous solution component, and about 40% of structural flame-retardant isocyanate. According to the proportion of the main total amount, the main components are classified into inorganic components, so the silicate-modified polymer grouting material for leakage plugging has excellent flame retardant performance, oxygen index ≥35%, adhesion ≥1.5 mPa, maximum reaction temperature ≤95° C., odor level (80° C.) ≤3.5, fog test ≤5 mg (without physical additive flame retardants diffusion to the environment). In particular, a main component of the silicate-modified aqueous solution, endows it with good surface resistance.

2 Claims, No Drawings

SILICATE-MODIFIED POLYMER GROUTING MATERIAL FOR LEAKAGE PLUGGING

CROSS REFERENCE OF RELATED APPLICATION

The present application claims priority under 35 U.S.C. 119(a-d) to CN 202210109293.1, filed Jan. 28, 2022.

BACKGROUND OF THE PRESENT INVENTION

Field of Invention

The invention relates to a silicate-modified polymer grouting material for leakage plugging, which belongs to the technical field of silicate modification.

Description of Related Arts

During the excavation process of coal mine tunnels and tunnels, broken or loose coal and rock mass often lead to the occurrence of accidents such as roof fall, rib spalling, landslide, etc., which not only seriously endanger the life safety of workers, but also seriously affect the production efficiency of coal mining enterprises. Therefore, in the production process, grouting/spraying reinforcement is generally performed on the broken coal mass. There are various types of grouting materials, generally classified into inorganic grouting materials and organic grouting materials. Inorganic materials are widely used in water glass cement two-liquid grouting. The advantages of the inorganic material are that the cost is low and the reaction is basically not exothermic, but the curing speed is slow, the compressive strength and bonding strength are low, and the permeability and toughness are poor. Organic grouting materials include acrylamide chemical grouting materials, epoxy resin chemical grouting materials, methyl methacrylate chemical grouting materials, urea-formaldehyde resin chemical grouting materials and polyurethane chemical grouting materials.

The plugging material has the functions of anti-weathering, anti-rust, anti-corrosion, restoration and repair, two-gang reinforcement (completing spraying work of hundreds of feet of parallel roadway within a few hours), replacing hanging nets, temporary roof protection, etc. The specific application cases are:

(1) General support: rock support between bolts, surface support;

(2) Temporary roof protection: the main means of temporary support after blasting, the temporary support before injection concrete, the temporary support of shield tunnels under difficult surrounding rock conditions, to prevent the surrounding rock from falling;

(3) Special support: reducing rock burst damage, reinforcement of ore pillars, padding and stabilization of large-diameter mechanical drilling, padding of sliding mines, and stabilization of return air passages;

(4) sealant; and (5) Wall rock degradation including weather erosion, rheology, expansion, and disintegration; wall rock alteration including moisture, heat, tidal, and chemical pollution.

There are currently two main types of plugging materials: cement polymer mortar mixed with aggregate spraying and polyurethane foam.

There are many applications of cement polymer mortar mixed aggregate spraying. The current problems are as follows. 1. The viscosity is high, and it is difficult to penetrate into the tiny cracks when sprayed at high speed to the surface of the coal body. It spreads and flows on the surface of the coal body, and the small pores and fissures in its interior are clustered, all of which form gas and water channels, and completely isolating and sealing is not capable of being completed. 2. There is no expansion, requiring more raw materials and adding powder to stir on the spot, which is easy to exceed the standard of dust, and workers are at risk of inhalation of silicosis. 3. The solidification time is long, and putting into use quickly after spraying cannot be achieved.

Polyurethane foam has the following advantages: 1. Low viscosity, being capable of penetrating into small cracks well; 2. Excellent adhesion ability to form a strong bond with the formation; 3. Good flexibility being capable of withstand subsequent formation movement; 4. The foaming time being adjustable, as fast as a few seconds, and as slow as a few minutes; 5. The foaming ratio being adjustable, 5-10 times, 20-50 times, and being adjustable according to customer requirements; 6. The foam having the characteristics of high flash point, flame retardant, no harmful gas, and being incompatible with water; 7. Once solidified after foaming, the broken matrix being quickly reinforced, and being not brittle when compressed by 20-30%.

However, there are following two important problems in the polyurethane foam. 1. Polyurethane foam material is not suitable for the situation where the roadway wall is relatively damp or has clear water, and it cannot be bonded. It is difficult to meet the cohesive force specified in AQ 1088-2011 Technical Conditions of Polymer Materials for Coal Mine Spraying and Plugging. 2. Polyurethane foam has no affinity with water, and at the same time, due to its foam structure, the surface resistance cannot be qualified, but the insulation performance is relatively good.

SUMMARY OF THE PRESENT INVENTION

The silicate-modified polymer material for leakage plugging of the present invention adopts pre-polyisocyanate-modified silicate, combines the advantages of inorganic grouting materials and polymer grouting materials, compared with polyurethane spraying currently used in coal mines to spray cement polymer mortar mixed with aggregates, the present invention solves the shortcomings in the conventional arts.

A first object of the present invention is to provide a silicate-modified polymer material for leakage plugging, comprising: prepolymerized isocyanate and silicate modified aqueous solution with a mass ratio at a range of 1:(1.2-1.4), wherein the prepolymerized isocyanate is a prepolymer obtained by the polymerization of trimethylol phosphine oxide and TDI, and has a chemical structural formula as follows:

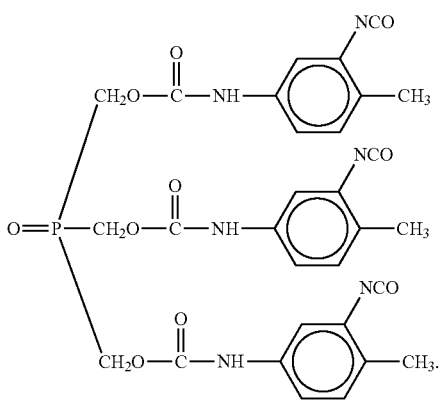

Preferably, P content of the prepolymerized isocyanate is 4.7%, N content of the prepolymerized isocyanate is 12.7%, and NCO % content of the prepolymerized isocyanate is 19%.

Preferably, the silicate-modified aqueous solution comprises: liquid sodium silicate, water, and a catalyst; wherein the liquid sodium silicate accounts for 82-87% of the silicate-modified aqueous solution by weight, and the water accounts for 12-15% by weight of the silicate-modified aqueous solution, and the catalyst accounts for 1.5-2.5% by weight of the silicate-modified aqueous solution.

Preferably, the liquid sodium silicate is an aqueous solution of sodium silicate, and a Baume degree thereof is 40.

Preferably, the liquid sodium silicate adopts 2451 by Qingdao Gulf Chemical

Preferably, the catalyst is a diethylene glycol solution of triethylenediamine with a concentration of 33%.

Preferably, the catalyst adopts 33lv by Evonik Chemistry.

A second object of the present invention is to provide a method for synthesizing the silicate-modified polymer material for leakage plugging, comprising: a step of mixing pre-polyisocyanate and silicate modified aqueous solution, wherein the pre-polyisocyanate is obtained by polymerizing hydroxymethyl phosphine oxide and TDI, and a reaction equation is:

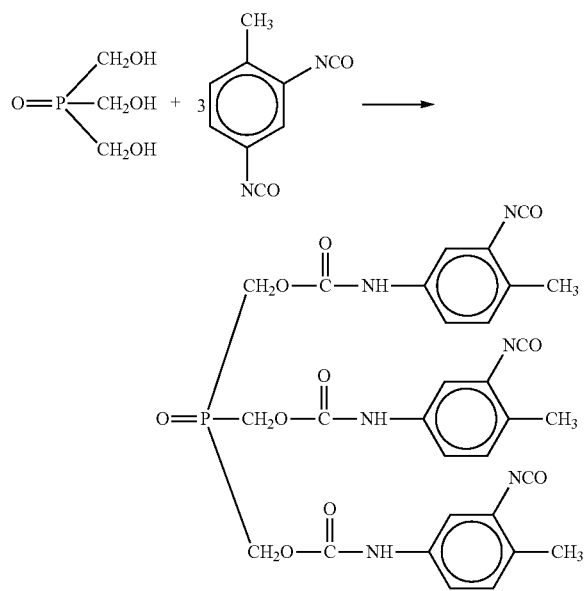

Preferably, a specific synthesis process comprises steps of:

(1) heating a reaction kettle to 48° C.-52° C.;

(2) firstly adding all TDI, and then adding all trimethylol oxidized phosphine according to trimethylol phosphine oxide (purchased from Hubei Xingfa Chemical Group Co., Ltd.): TDI=1:(4-8) molar ratio;

(3) heating the reaction kettle to 78° C.-82° C., and then reacting for 1.9 h-2.2 h;

(4) by a thin film evaporator, removing excess TDI that has not reacted;

(5) then cooling the reaction kettle to 48° C.-52° C., taking out from the kettle and packaging to obtain pre-polyisocyanate with P content of 4.7%, N content of 12.7%, and NCO % content of 19%;

(6) mixing the pre-polyisocyanate and the silicate-modified aqueous solution according to a mass ratio 1:(1.2-1.4) to obtain the silicate-modified polymer material for leakage plugging.

The silicate-modified polymer material for leakage plugging of the present invention uses pre-polyisocyanate-modified silicate, and combines the advantages of inorganic grouting materials and polymer grouting materials. Compared with the cement polymer mortar mixed aggregate spraying and polyurethane spraying commonly used in coal mines at present, the material of the present invention solves the shortcomings involved in the conventional arts.

Compared with the cement polymer mortar mixed aggregate spraying commonly used in coal mines at present:

1. The fine slurry is sprayed to the surface of the coal body at high speed and invades the small cracks. The slurry material in the tiny cracks can improve the cohesive force and internal friction angle of the coal body, and further improve the residual strength of the coal body; fill in the small unevenness of the surrounding rock to eliminate local stress concentration and avoid flaky spalling.

2. It has expansibility, and the expansion ratio is 5-10 times, which reduces the transportation of raw materials in the well;

3. It is completely wet sprayed, and there is no rebound and dust exceeding the standard phenomenon, which completely avoids the danger of inhalation of silicosis by workers;

4. Internally cured and put into use in 1 minutes; the elongation at break after curing is much higher than that of ordinary concrete (30% to 50% elongation), and the overall toughness characteristics can adapt to coal (surrounding rock) and metal supports during the service period, avoiding the cracking and spalling phenomenon of shotcrete caused by deformation.

5. After forming, the roadway wall is bright milky white, with good appearance and high degree of standardization, and the surface of the thin sprayed layer is smooth. Compared with the porous surface of the concrete sprayed layer, the material of the present invention is not easy to adhere to coal dust.

Compared with mesh polyurethane foam spraying:

1. The main raw material is silicate modified aqueous solution, which is suitable for wet or clear water conditions like cement polymer mortar mixed aggregate;

2. Also because its main raw material is silicon Acid-modified aqueous solution, the surface has a good affinity with water, naturally has a small surface resistance, and has antistatic properties;

3. Due to the introduction of pre-polymerized trimethylol phosphine oxide and TDI into the isocyanate component compared with traditional isocyanates, such as polymethylene polyphenyl polyisocyanates, TDI, MDI, polyisocyanates and pre-polyisocyanates have more flexible segments, and contain N and P elements with flame retardant functions, which can give materials Better flame retardant ability and toughness make the material break through the bottleneck problem of hard and brittle inorganic materials, and further increase the flame retardant upper limit of polyurethane materials;

4. Because the prepolymerized isocyanate in the isocyanate component is released in advance during the prepolymerization process part of the reaction heat, the silicate-modified aqueous solution contains more than 30% moisture and has a good endothermic effect. These two reasons make the material have a lower heat release than the polyurethane organic material, and the maximum reaction temperature ≤95° C., which improves the safety of the material in coal mine application.

5. The silicate-modified polymer material for leakage plugging of the present invention does not contain halogen flame retardants, and has a small amount of smoke, and the smoke gas toxicity index is less than or equal to 5. The material of the present invention will not release corrosive or irritating hydrogen halide gas, will not produce toxic carcinogens polybrominated benzoxin and polybrominated dibenzofuran, and will not increase the halogen content in coal.

DETAILED DESCRIPTION OF THE PREFERRED EMBODIMENT

The technical solutions in the examples of the present invention will be clearly and completely described below. Obviously, the examples described are only a part of the examples of the present invention, rather than all the examples. Based on the examples in the present invention, all other examples obtained by those of ordinary skill in the art without creative work are within the protection scope of the present invention.

Example 1

A specific example of the applying pre-polyisocyanate compound in this Example to the silicate-modified polymer material for leakage plugging is as follows.

(1) The formula of silicate aqueous solution is as follows:

| | |
|---|---|
| 2451 (Aqueous silicate solution, Qingdao Bay) | 85 |
| Water | 13 |
| A33 (Catalyst, Evonik Specialty Chemicals (Shanghai) Co., Ltd.) | 2 |
| Total | 100 |

(2) (2) Pre-polymerized isocyanate A:

Pre-polymerized isocyanate A is obtained by polymerizing trimethylol phosphine oxide and TDI to obtain a prepolymer; wherein P content is 4.7%, N content is 12.7%, and NCO % content is 19%. A chemical structure of the pre-polymerized isocyanate A is as follows:

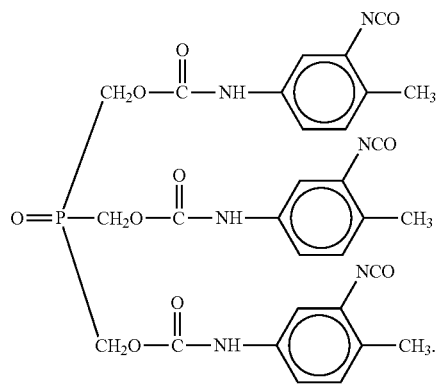

Prepolymerized isocyanate A is obtained by polymerizing trimethylol phosphine oxide and TDI, wherein a reaction equation is as follows:

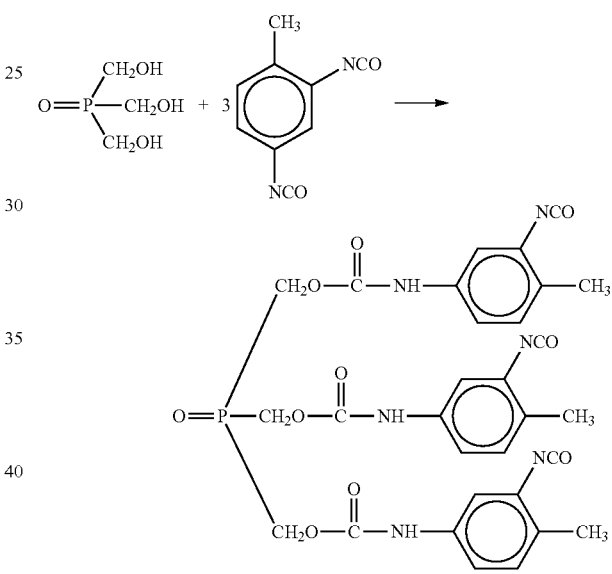

A specific synthesis process comprises steps of:

(1) heating a reaction kettle to 50° C.;

(2) firstly adding 1000 g of TDI, and then adding 160 g of trimethylol oxidized phosphine with a uniform speed according to trimethylol phosphine oxide (purchased from Hubei Xingfa Chemical Group Co., Ltd.): TDI=1:5 molar ratio;

(3) heating the reaction kettle to 80° C., and then reacting for 2 h;

(4) by a thin film evaporator, removing excess TDI that has not reacted;

(5) then cooling the reaction kettle to 50° C., taking out from the kettle and packaging to obtain pre-polyisocyanate with P content of 4.7%, N content of 12.7%, and NCO % content of 19%;

130 parts of the above-mentioned silicate aqueous solution and 100 parts of the isocyanate component of each examples in the following table are mixed and stirred to prepare the silicate modified polymer material for leakage plugging in the Examples.

Examples 1-6

In the following table, E 1—Example 1; E2—Example 1; E3—Example 3; E4—Example 4; E5—Example 5; E6—Example 6

| Component | Name | E 1 | E 2 | E 3 | E 4 | E 5 | E 6 |
|---|---|---|---|---|---|---|---|
| Isocyanate | Prepolymerized Isocyanate A | 100 | 0 | 0 | 0 | 0 | 0 |
| | WANNATE ® PM-200 Wanhua Chemical Group Co., Ltd. | 0 | 100 | 0 | 0 | 100 | 100 |
| | WANNATE ® CDMDI-100L Wanhua Chemical Group Co., Ltd. | 0 | 0 | 100 | 0 | 0 | 0 |
| | WANNATE ® 8312 | 0 | 0 | 0 | 100 | 0 | 0 |
| | TEP | 0 | 0 | 0 | 0 | 38 | 0 |
| | TCPP | 0 | 0 | 0 | 0 | 0 | 98 |

Note: WANNATE® 8312 is a pre-polymer of DL2000 and MDI, with a viscosity (25° C.) of 550-800 mPas, a NOC % at a range of 15.0-16.0%, and is a colorless or light yellow transparent liquid at room temperature.

WANNATE® CDMDI-100L is liquefied MDI.

WANNATE® PM-200 is a polymethylene polyphenyl polyisocyanate.

The isocyanates in the above examples 1, 2, 3, 4, 5, and 6 according to the formula fractions in the above table are equivalent in weight, and fully reacted with the silicate aqueous solution by a weight ratio of 100:130.

| | Item | Example 1 | Example 2 | Example 3 | Example 4 | Example 5 | Example 6 |
|---|---|---|---|---|---|---|---|
| Flame retardant properties | Oxygen Index | 37.2 | 29.5 | 30.5 | 29.3 | 35.0 | 36.0 |
| Physical properties | Density kg/m³ | 165 | 160 | 155 | 162 | 159 | 159 |
| | Adhesion | 1.58 | 1.21 | 1.10 | 1.53 | 1.18 | 1.08 |
| | Maximum reaction temperature/° C. | 91 | 120 | 115 | 98 | 105 | 103 |
| | elongation at break/% | 35% | 15% | 17% | 31% | 10% | 9% |
| Environmental performance | Fog test | 3.9 | 5.8 | 5.9 | 3.9 | 49 | 69 |
| | Odor rating (80° C.) | 3.5 | 4.0 | 4.0 | 3.5 | 4.5 | 4.5 |
| | Halogen content | 0 | 0 | 0 | 0 | 0 | 17% |
| | Smoke Toxicity Index | 3.7 | 4.0 | 4.2 | 3.9 | 5.7 | 6.8 |

The flame retardant and physical properties of each example are as follows:

Flame Retardant Properties and Physical Properties Test Standard: AQ1089-2020

Odor level test standard: VDA270: 1992,

Fog test test standard: Q/ZK JS 364-201903

On the basis of Example 1, Example 2 utilizes WANNATE® PM-200 of the same quality instead of modified Isocyanate A, everything else remained unchanged, the oxygen index was reduced from 37.2 to 29.5, and the flame retardant performance was reduced; the adhesion was reduced from 1.58 to 1.21 MPa, the bond strength decreased; the maximum reaction temperature increased from 91° C. to 120° C., the maximum reaction temperature increased significantly; the elongation at break decreased from 35% to 15%, the flexibility decreased; the fog test increased from 3.9 to 5.8, the odor level From 3.5 to 4.0, the flue gas toxicity index increased from 3.7 to 4.0, and the environmental protection performance decreased. To sum up, it shows that compared with WANNATE® PM-200, modified isocyanate can endow silicate modified polymer materials for leakage plugging with better flame retardant performance and environmental protection performance, lower maximum reaction temperature, and better performance. toughness and bond strength.

Example 3 is on the basis of Example 1, WANNATE®CDMDI-100L of the same quality was used instead of modified isocyanate. Everything else remained unchanged. The oxygen index was reduced from 37.2 to 30.5, indicating that the flame retardancy decreased; the adhesion was reduced from 1.58 to 1.10 MPa., the bond strength decreased; the maximum reaction temperature increased from 91° C. to 115° C., and the maximum reaction temperature increased significantly; the elongation at break decreased from 35% to 17%, and the flexibility decreased; the fog test increased from 3.9 to 5.9, and the odor level increased from 3.9 to 5.9. From 3.5 to 4.0, the flue gas toxicity index rose from 3.7 to 4.2, and the environmental performance decreased. To sum up, it shows that compared with WANNATE®CDMDI-100L, modified isocyanate can endow the silicate modified polymer material for leakage plugging with better flame retardant performance and environmental protection performance, lower maximum reaction temperature, and better performance of toughness and bond strength.

Example 4 is on the basis of Example 1 and uses WANNATE® 8312 of the same quality to replace the modified isocyanate, everything else remains unchanged, the elongation at break is reduced from 35% to 31%, the flexibility is only slightly decreased, but the oxygen index is from 37.2 It can be reduced to 29.3, which means that under the same toughness, the modified isocyanate A can give the material better flame retardant properties; the adhesion force is reduced from 1.58 to 1.53 MPa, and the bond strength is only slightly decreased; the maximum reaction temperature increased from 91° C. to 98° C., the maximum reaction temperature increased significantly; the fog test did not change, the odor level did not change, the smoke toxicity index rose from 3.7 to 3.9, and the environmental performance was comparable. To sum up, it is shown that the modified isocyanate has the same toughness and environmental protection performance compared with WANNATE® 8312, but it can endow the silicate modified polymer material for leakage plugging with better flame retardant performance.

Example 5 is on the basis of Example 1, PM200 and flame retardant TEP are used to replace modified isocyanate A.

The phosphorus content in the isocyanate component is 4.7%, which is the same as modified isocyanate A, and everything else remains unchanged. The adhesion is from 1.58 Reduced to 1.18 MPa, the bond strength decreased; the maximum reaction temperature increased from 91° C. to 105° C., the maximum reaction temperature increased significantly; the elongation at break decreased from 35% to 10%, the flexibility decreased greatly; the fog test increased from 3.9 to 49, the odor level has risen from 3.5 to 4.5, the smoke toxicity index has risen from 3.7 to 5.7, and the environmental performance has dropped significantly. To sum up, it shows that compared with PM200 and flame retardant TEP, the modified isocyanate can endow the silicate modified polymer material for leakage plugging with better environmental performance and lower maximum response temperature and better toughness and bond strength when the phosphorus content is the same.

Example 6 is on the basis of Example 1, PM200 and flame retardant Tcpp are used to replace modified isocyanate A. The phosphorus content in the isocyanate component is 4.7%, which is consistent with modified isocyanate A, and everything else remains unchanged. The adhesion is from 1.58 Reduced to 1.08 MPa, the bond strength decreased; the maximum reaction temperature increased from 91° C. to 103° C., and the maximum reaction temperature increased significantly; the elongation at break decreased from 35% to 9%, and the flexibility decreased significantly; the fog test increased from 3.9 to 69, the odor level has risen from 3.5 to 4.5, the smoke toxicity index has risen from 3.7 to 6.8, and the environmental performance has dropped significantly. To sum up, it shows that compared with PM200 and flame retardant TCPP, the modified isocyanate can endow the silicate modified polymer material for leakage plugging with better environmental performance and lower maximum response temperature, better toughness and bond strength when the phosphorus content is the same.

Example 7

The cement polymer mortar mixed aggregate spray coating commonly used in coal mines was selected for testing, and the test results are shown in the following table.

| Items | Example 1 | Example 7 |
| --- | --- | --- |
| Curing time | 1 min | 2 h |
| Density kg/m$^3$ | 165 | No foaming |
| Adhesion | 1.58 | 0.8 |
| Maximum reaction temperature/° C. | 91 | — |
| Elongation at break, % | 35% | 5% |
| Fog test | 3.9 | 6.0 |
| Odor rating (80° C.) | 3.5 | 4.2 |
| Smoke Toxicity Index | 3.7 | 3.8 |
| Whether there is dusty | No | Heavy dusting when powder and emulsion are mixed |
| Whether there is sagging | No | Easy to sag when the powder content is small |
| Whether there are small cracks | No | Small cracks are easy to exist when the powder content is high |
| Whether there is a local cracking problem | No | Yes |
| Whether there is a shedding problem | No | Yes |

From the comparison between Example 7 and Example 1, the silicate-modified polymer material for leakage plugging explained in the present invention does not have the problems of local cracking and falling off, as well as springback and dust, which are commonly used in coal mines. Exceeding the standard, sagging phenomenon; fast curing time, can be cured and put into use within 1 min, the elongation at break after curing reaches 35%, far exceeding the elongation of ordinary concrete by 5%, and the bond strength is 1.58 MPa, which is better than that commonly used in coal mines. Cement polymer mortar mixed with aggregate spray coating 0.8 MPa. To sum up, the silicate-modified polymer material for leakage plugging described in the present invention is much better than the cement-polymer-mortar mixed aggregate spray coating commonly used in coal mines in adhesion, flexibility, curing time, and environmental protection performance.

Example 8

The formula and properties of conventional polyurethane materials are shown in the following table:
The recipe is shown in the table below:

| No. | Component A | Mass fraction | Component B | Mass fraction |
| --- | --- | --- | --- | --- |
| 1 | Polyether 8630 | 40 | WANNATE ®PM-200, | 100 |
| 2 | Polyether 2305 | 25 | | |
| 3 | TCPP | 25 | | |
| 4 | Water | 0.5 | | |
| 5 | 141b | 7.5 | | |
| 6 | Potassium acetate | 2 | | |
| 7 | Total | 100 | Total | 100 |

The performance data comparison is shown in the following table:

| No. | Performance | Data in Example 8 | Data in Example 1 |
| --- | --- | --- | --- |
| 1 | Oxygen Index | 29 | 35.2 |
| 2 | Density kg/m$^3$ | 45 | 165 |
| 3 | adhesion | 0.9 | 1.58 |
| 4 | Maximum reaction temperature/° C. | 120 | 91 |
| 5 | Odor rating (80° C.) | 4.0 | 3.5 |
| 6 | Fog test | 53 | 3.9 |
| 7 | Halogen content | 3.86% | 0 |
| 10 | Elongation at break (%) | 15% | 35% |
| 11 | Surface resistance (Ω) | $3.5 \times 10^9$ | $1.5 \times 10^5$ |

Comparing the data of Example 8 and Example 1, it can be found that when the oxygen index of the traditional organic polyurethane material reaches 29, the maximum reaction temperature is 120° C., which exceeds the maximum reaction temperature of Example 1 of 91° C., which increases the application in coal mines. Potential safety hazards; Example 8 odor level (80° C.), 4.0, fog test 53, Example 1 odor level 3.5, fog test 3.9, Example 1 has better environmental performance; Example 8 halogen content 3.86%, when burning It will release corrosive or irritating hydrogen halide gas, produce poisonous carcinogens polybrominated benzoxins and polybrominated dibenzofurans, and increase the halogen content in coal. The surface resistance of Example 8 reached 1.5×10$^9$Ω, far exceeding the surface resistance of Example 1, which was 3.7×10$^5$Ω. The elongation at break of Example 8 was 15%, the elongation at break of 1 was 35%, and the toughness of Example 1 was better. Excellent, in summary, the silicate-modified polymer material for leakage plugging described in the present invention has better environmental protection performance and toughness, lower surface conductivity and better safety performance than traditional organic polyurethane materials.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A silicate-modified polymer material for leakage plugging, comprising: prepolymerized isocyanate and silicate modified aqueous solution with a mass ratio at a range of 1:(1.2-1.4), wherein the prepolymerized isocyanate is a prepolymer obtained by the polymerization of trimethylol phosphine oxide and TDI, and has a chemical structural formula as follows:

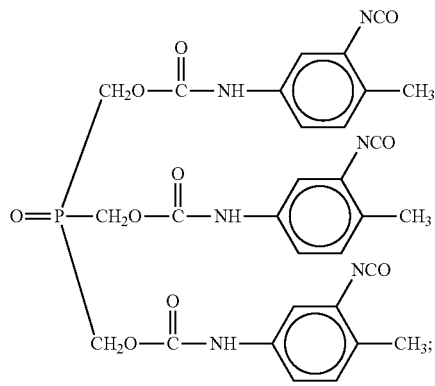

wherein P content of the prepolymerized isocyanate is 4.7%, N content of the prepolymerized isocyanate is 12.7%, and NCO % content of the prepolymerized isocyanate is 19%;

wherein the silicate-modified aqueous solution comprises: liquid sodium silicate, water, and a catalyst; wherein the liquid sodium silicate accounts for 82-87% of the silicate-modified aqueous solution by weight, and the water accounts for 12-15% by weight of the silicate-modified aqueous solution, and the catalyst accounts for 1.5-2.5% by weight of the silicate-modified aqueous solution;

wherein the liquid sodium silicate is an aqueous solution of sodium silicate, and a Baume degree thereof is 40;

wherein the catalyst is a diethylene glycol solution of triethylenediamine with a concentration of 33%.

2. A method for synthesizing the silicate-modified polymer material for leakage plugging, as recited in claim 1, comprising: a step of mixing pre-polyisocyanate and silicate modified aqueous solution, wherein the pre-polyisocyanate is obtained by polymerizing hydroxymethyl phosphine oxide and TDI, and a reaction equation is:

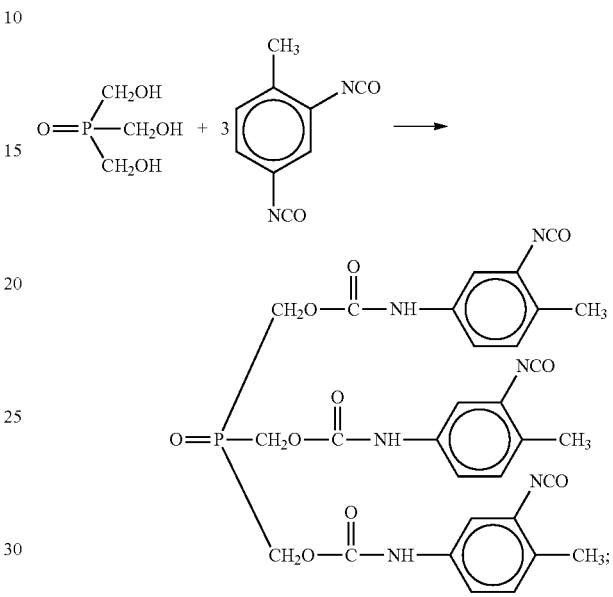

wherein a specific synthesis process comprises steps of:
(1) heating a reaction kettle to 48° C.-52° C.;
(2) firstly adding all TDI, and then adding all trimethylol oxidized phosphine according to trimethylol phosphine oxide (purchased from Hubei Xingfa Chemical Group Co., Ltd.): TDI=1:(4-8) molar ratio;
(3) heating the reaction kettle to 78° C.-82° C., and then reacting for 1.9 h-2.2 h;
(4) by a thin film evaporator, removing excess TDI that has not reacted;
(5) then cooling the reaction kettle to 48° C.-52° C., taking out from the kettle and packaging to obtain pre-polyisocyanate with P content of 4.7%, N content of 12.7%, and NCO % content of 19%;
(6) mixing the pre-polyisocyanate and the silicate-modified aqueous solution according to a mass ratio (1.2-1.4):1 to obtain the silicate-modified polymer material for leakage plugging.

* * * * *